United States Patent [19]

Noda

[11] Patent Number: 4,872,827
[45] Date of Patent: Oct. 10, 1989

[54] POROUS DIE

[75] Inventor: Yasuyoshi Noda, Konan, Japan

[73] Assignee: KTX Co., Ltd., Aichi, Japan

[21] Appl. No.: 136,914

[22] Filed: Dec. 22, 1987

[30] Foreign Application Priority Data

Jul. 2, 1987 [JP] Japan .................... 62-166469

[51] Int. Cl.$^4$ ............... B29C 39/38; B29C 45/34
[52] U.S. Cl. .................... 425/526; 249/79; 249/141; 425/547; 425/552; 425/812
[58] Field of Search .......... 425/812, 522, 526, 547, 425/549, 552, 378, 379, 388; 55/413, 414; 249/141, 79, 80, 81

[56] References Cited

U.S. PATENT DOCUMENTS

| | | | |
|---|---|---|---|
| 1,722,870 | 7/1929 | Waters | 55/413 |
| 2,100,112 | 11/1937 | Taylor | 55/413 |
| 2,792,593 | 5/1957 | Hardgrove, Jr. | 425/526 |
| 3,078,508 | 2/1963 | Martin, Jr. | 425/812 |
| 3,431,331 | 3/1969 | Pincus et al. | 425/812 |
| 3,941,528 | 3/1976 | Cotterell | 425/4 R |
| 4,050,913 | 9/1977 | Roach | 55/276 |
| 4,091,069 | 5/1978 | Allen | 264/328 |
| 4,139,177 | 2/1979 | Hanning | 249/66 C |
| 4,192,638 | 3/1980 | Lezier et al. | 425/256 |
| 4,208,177 | 6/1980 | Allen | 425/404 |
| 4,212,623 | 6/1980 | Allen | 425/547 |
| 4,221,753 | 9/1980 | Bradbury | 264/142 |
| 4,233,710 | 11/1980 | Wagner | 17/32 |
| 4,298,324 | 11/1981 | Soulier | 425/174.8 E |
| 4,327,045 | 4/1982 | Nishikawa et al. | 264/51 |
| 4,655,280 | 4/1987 | Takahashi | 165/47 |
| 4,781,555 | 11/1988 | Cook | 425/4 R |

Primary Examiner—Jay H. Woo
Assistant Examiner—Khanh P. Nguyen
Attorney, Agent, or Firm—Michael D. Rechtin; Philip P. Mann

[57] ABSTRACT

A porous die includes a porous die body with a plurality of pores formed therein; a cooling chamber provided in direct contact with the back side of the porous die body in order to cool the porous die body; a device for supplying a coolant to the cooling chamber; and suction holes through which the cooling chamber is evacuated and the air and the coolant entering the cooling chamber are simultaneously sucked.

8 Claims, 5 Drawing Sheets

FIG.6
FIG.7
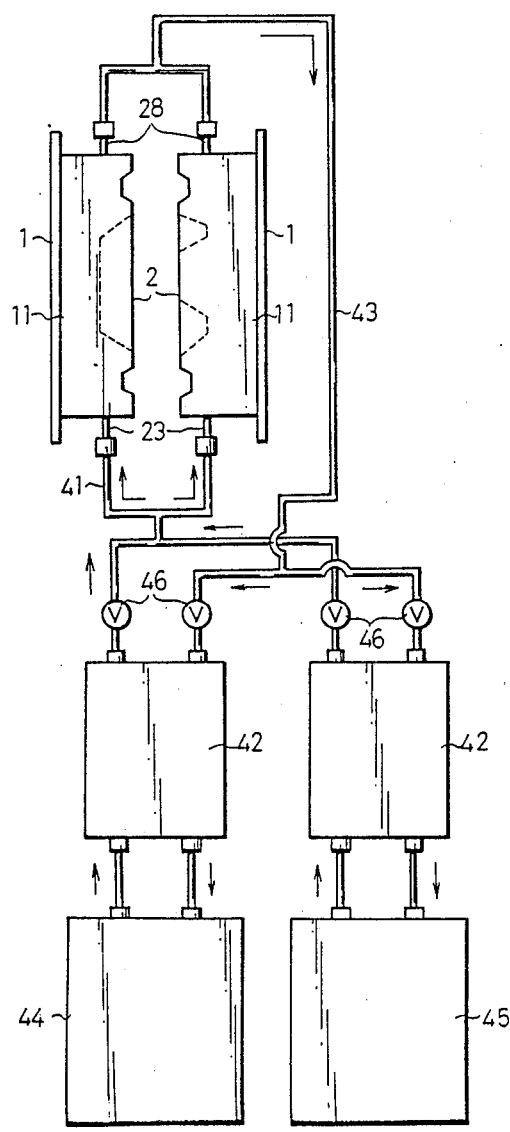
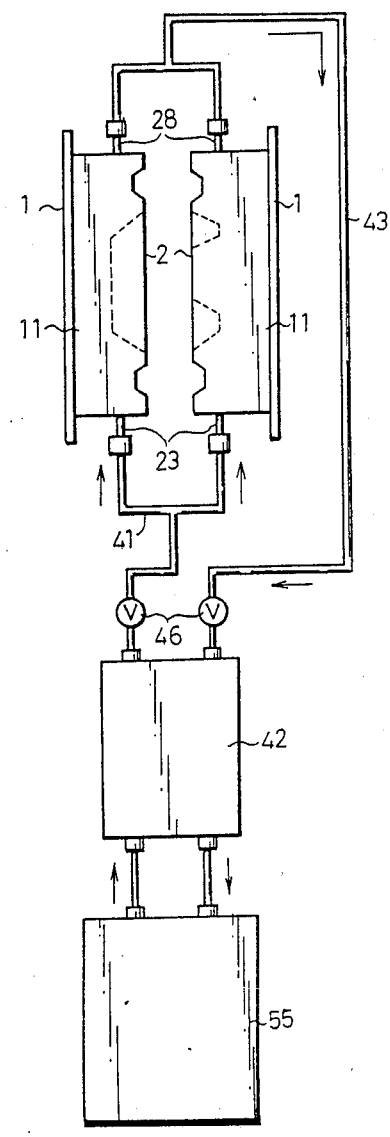

POROUS DIE

BACKGROUND OF THE INVENTION

1. Field of the Invention

The present invention relates to a permeable porous die used for molding a synthetic resin by blow molding, vacuum molding, injection molding, rim urethane molding or the like, and a method of molding a synthetic resin by using the porous die.

2. Description of the Related Art

This kind of porous die is generally composed of a thin-walled porous die body with a multiplicity of pores formed therein by laser beam machining, electroforming or other methods, and a reinforcing member for reinforcing the back side of the porous die body. The pores are formed so that the synthetic resin which is to be molded may be sucked under vacuum therethrough from the back side of the porous die body so as to attract it to the surface of the porous die body.

The porous die is likely to be overheated due to the heat of the synthetic resin during molding, so that(the molding cycle the period between the end of one molding and the start of the next molding) is apt to be long. The following measures are therefore taken in order to positively cool the porous die:

(1) A cooling pipe through which a coolant is passed is brought into contact or connected to the back side of the porous die body.

(2) A circulation chamber through which a coolant is passed is provided on the back side of the porous die body with a space therebetween so as to conduct the heat of the porous die body through metal members such as stud bolts and to release the heat into the circulation chamber.

Both of the cooling measures (1) and (2), however, are disadvantageous in that there is nonuniformity in the cooling of the porous die body, it is difficult to determine the location of the cooling pipe or the like, the cooling ability is not enough to effectively shorten the molding cycle, and so on.

For example, when the applicant of the present invention molded an ABS resin by using the porous die with the cooling measure (2) adopted, it is only to about 6 minutes that the molding cycle was shortened.

SUMMARY OF THE INVENTION

Accordingly, it is an object of the present invention to eliminate the above-described problems in the related art and to provide a porous die having a good molding efficiency.

It is another object of the present invention to provide a porous die which is capable of accurately reproducing a fine surface configurations.

It is still another object of the present invention to provide a porous die which is capable of maintaining uniformity in cooling.

It is a further object of the present invention to provide a method of molding synthetic resin using a porous die with capability for cooling the porous die efficiently, strongly and uniformly.

To achieve this aim, a porous die according to the present invention comprises: a porous die body with a plurality of pores formed therein, a cooling chamber provided in direct contact with the back side of the porous die body in order to cool the porous die body, means for supplying a coolant to the cooling chamber and suction holes through which the cooling chamber is evacuated and the air and the coolant entering the cooling chamber are simultaneously sucked.

Other objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIGS. 6 and 7 show other examples of a porous die and a temperature controller.

DESCRIPTION OF THE PREFERRED EMBODIMENTS

Figure 1:
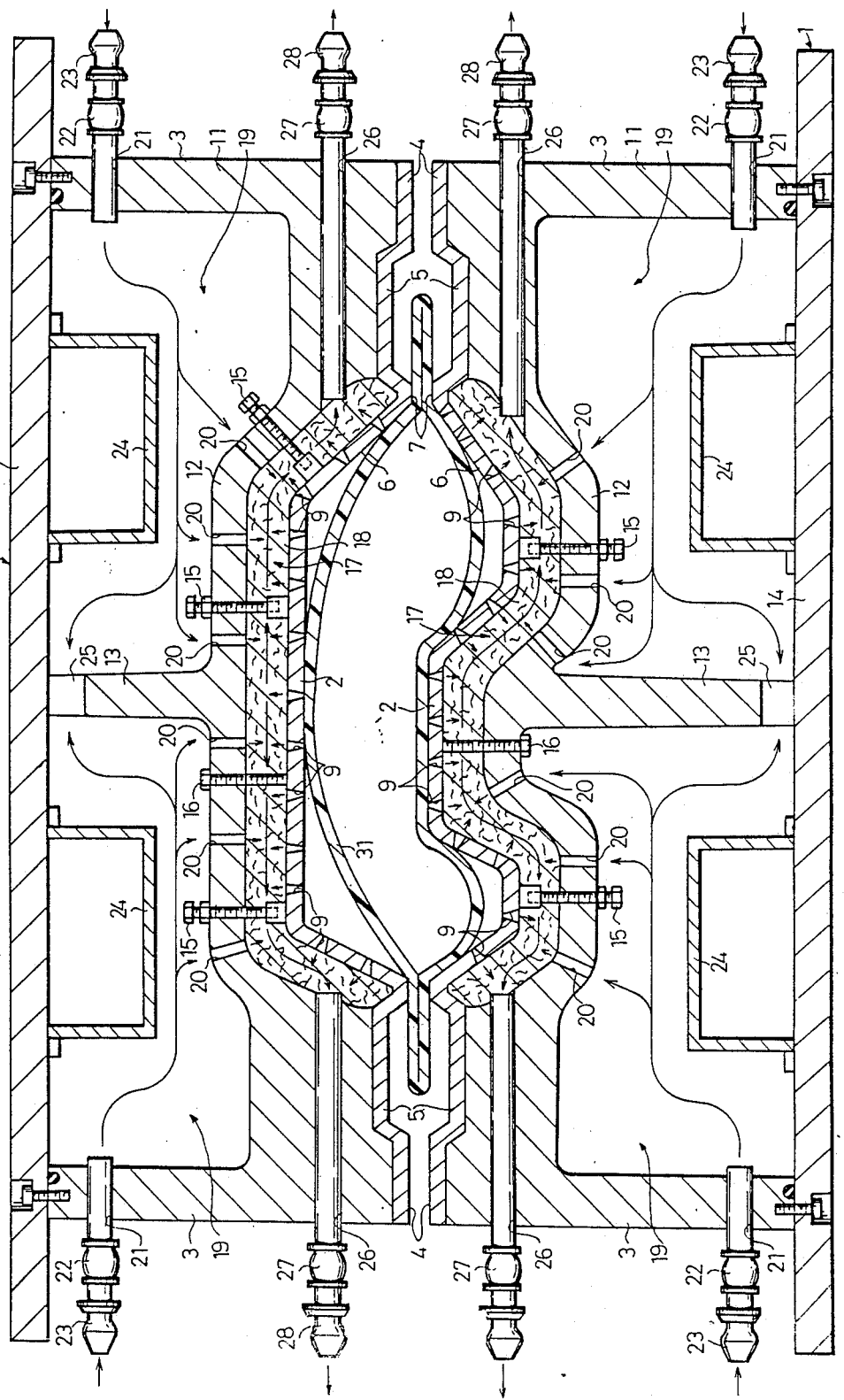
FIG. 1 is a cross sectional view of an embodiment of a porous die according to the present invention.
Figure 2:
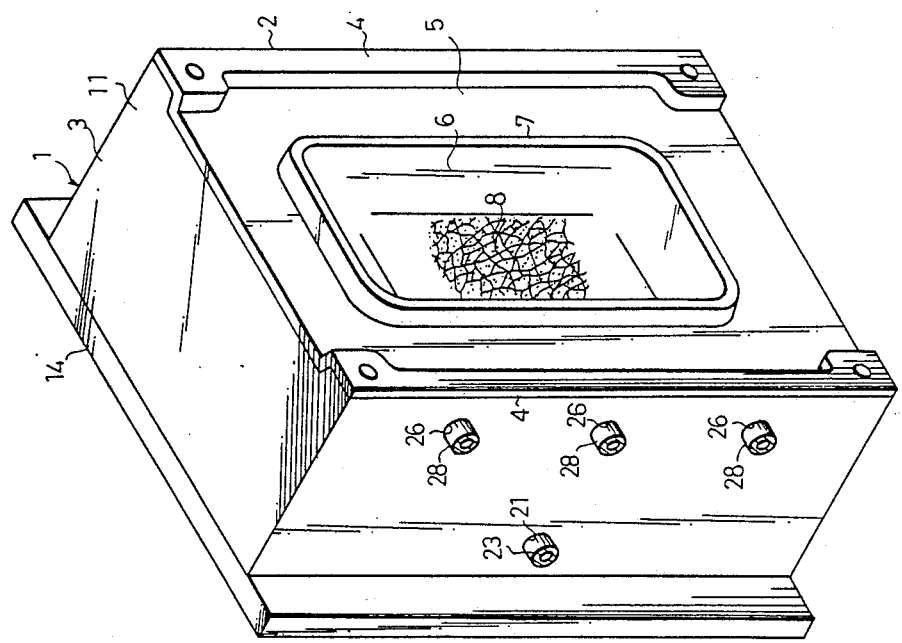
FIG. 2 is a perspective view of the embodiment shown in FIG. 1.

The present invention which is embodied into a right and left pair of porous dies used for blow molding a cover of an automobile console box will be explained hereinunder with reference to FIGS. 1 to 3. Since the fundamental structures of the right and left porous dies are the same, only the porous die on the left-hand side (upper side in FIG. 1) will be described in detail, while the same numerals are provided for the elements of the porous die on the right-hand side (lower side in FIG. 1) which are the same as those of the porous die on the left-hand side, the explanation thereof being omitted.

The porous die 1 of this embodiment is composed of a porous die body 2 with a multiplicity of pores formed therein and a reinforcing frame 3 to which the porous die body 2 is removably attached.

The porous die body 2 is composed of contact portions 4 on the front and rear surfaces, a recess 5 formed inside the contact portions 4, a concave molding portion 6 provided at the central portion, and a parting portion 7 provided on the periphery of the molding portion 6 so as to be flush with the contact portions 4. These portions are molded into one body by electroforming using nickel as the electrodeposition metal. The porous die body 2 has a width of 400 mm, a height of 55 mm and a thickness of 2 to 4 mm through the length and breadth.

Figure 3:
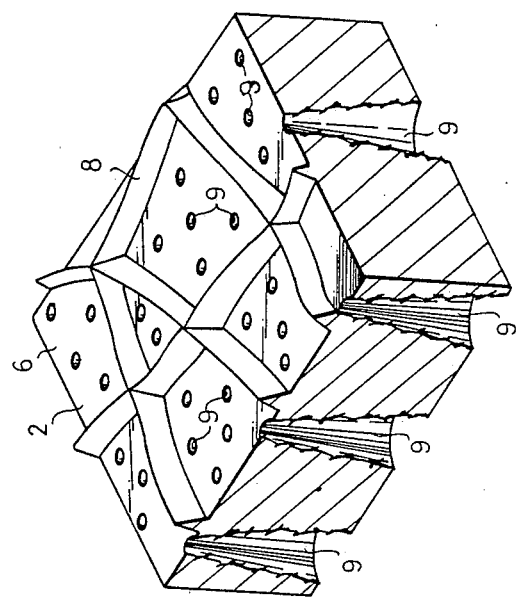
FIG. 3 is an enlarged perspective view of the porous die body of the embodiment shown in FIG. 1.

A crimp pattern 8 and a multiplicity of pores 9 are formed on the molding portion 6 of the porous mandrel body 2 by electroforming, as shown in FIG. 3. Each of the pores 9 penetrates through the molding portion 6 with the diameter gradually increasing from the surface side to the back side of the molding portion 6. The diameter of the pores 9 is preferably 50 to 500 $\mu$m on the surface of the molding portion 6 and 100 to 2,000 $\mu$m on the back side thereof. The density of distribution of the pores 9 is preferably 5 to 1,000 pores per 10 cm$^2$.

The reinforcing frame 3 is composed of a square frame body 11 made of a metal such as ZAS (zinc alloy), a reinforcing sheet 12 integrally formed with the frame body 11 on the inner and left-hand side thereof so as to have a similar configuration to that of the porous die body 2 and to serve as a partition, a rib 13 integrally provided on the back side of the reinforcing sheet 12, and a side plate 14 screwed to the left end surface of the frame body 11.

The porous die body 2 is screwed to the frame body 11 of the reinforcing frame 3 at the four corners of the contact portions 4, and the back side of the porous die body 2 is further supported and reinforced by the reinforcing sheet 12 through tension bolts 15 and compression bolts 16 which are provided at important positions.

The back side of the porous die body 2 is spaced from the reinforcing sheet 12 by 5 to 15 mm, and a cooling chamber 17 is provided therebetween so as to directly cool the back side of the porous die body 2. The cooling chamber 17 is densely filled with stainless steel fibrous bodies 18 which are rammed to such an extent as not to lose the permeability. The fibrous body 18 is excellent in heat conductivity and corrosion resistance. It is possible to use fibrous bodies of various metals such as copper, iron, nickel and aluminum in place of the stainless steel fibrous bodies 18.

Circulation chambers 19 are provided between the back side of the reinforcing sheet 12 and the side plate 14 of the reinforcing frame 3, and a plurality of through holes 20 having a diameter of about 2 mm are provided at important positions of the reinforcing sheet 12 at a substantially regular pitch of about 30 mm so that the circulation chambers 19 are brought into contact with the back side of the cooling chamber 17. The circulation chambers 19 and the through holes 20 through which a coolant passes constitute means for supplying the coolant to the cooling chamber 17.

Figure 4:
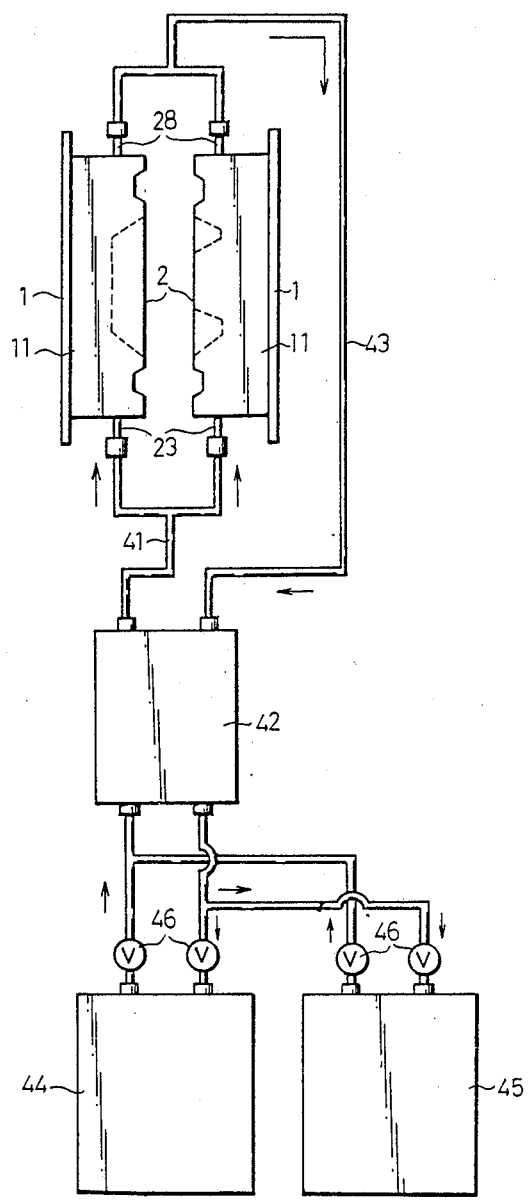
FIG. 4 shows the porous die shown in FIG. 1 and temperature controllers.

An inlet 21 is provided on both of the front and rear surfaces of the frame body 11 in the vicinity of the side plate 14. The inlet 21 communicates with the circulation chamber 19 and a coolant is poured into the circulation chamber 19 therethrough. The inlet 21 is provided with an inlet nozzle 23 having a valve 22. A coolant supply pipe 41 is connected to the inlet nozzles 23, as shown in FIG. 4.

In this embodiment, a suction pump 42 Logic Seal (trademark : produced by Gifu Seiki Kogyo K.K.) is used as a suction pump which has a function of both a coolant supplying device and a suction pump, and the coolant supply pipe 41 is connected to the inlet nozzles 23.

Box-shaped coolant flow control members 24 are attached to the side plate 14 so as to face the opening portions at the inner ends of the inlet nozzles 23 in the respective circulation chambers 19. Each of the coolant flow control members 24 causes the coolant poured from the inlet nozzle 23 to flow, along the back side of the reinforcing sheet 12, thereby enhancing the cooling efficiency of the cooling chamber 17 with respect to the porous die body 2. A coolant passage 25 is provided at a portion of the end of the reinforcing rib 13 in such a manner as to communicate with the circulation chambers 19.

Three suction holes 26 are provided on both the front and rear surfaces of the frame body 11. Each of the suction holes 26 communicates with the cooling chamber 17 and the air which enters the cooling chamber 17 from the pores 9 and the coolant which enters the cooling chamber 17 from the through holes 20 are simultaneously sucked from the suction holes 26. A suction nozzle 28 having a valve 27 is attached to the outer end of each suction hole 26. A suction pipe 43 of the suction pump 42 is connected to the suction nozzles 28, as shown in FIG. 4.

Two temperature controllers 44 and 45 which supply a coolant of a constant temperature to the suction pump 42 and collect the coolant therefrom are connected to the suction pump 42. One temperature controller 44 supplies a coolant of a high temperature of 80° to 100° C. to the suction pump 42, while the other temperature controller 45 supplies a coolant of a low temperature of 0° to 20° C. to the suction pump 42. The timing for starting or stopping the supply of the coolant to the suction pump 42 is controlled by opening or closing the valves 46 provided between the temperature controllers 44 and 45 and the suction pump 42 in accordance with the timing for molding.

A method of manufacturing the porous die body 2 will be explained here briefly.

A mandrel (not shown) having the same configuration as a cover of an automobile console box is first molded. The mandrel is molded by making a master model by pasting leather to a wooden pattern in order to obtain a crimp pattern, transferring the master model to a female mold, and pouring an epoxy resin into the female mold.

An electrically-conductive film is next formed on the surface of the mandrel. This electrically-conductive film is formed by spraying a liquid mixture of silver lacquer paste, a solution of butyl acetate and vinyl chloride lacquer, or by utilizing silver mirror reaction.

The mandrel is next dipped in a plating solution (not shown) which contains nickel sulfamate and boric acid as the main constituents and no surfactant which restrains the generation of a pin hole. Electroforming is carried out by electrical discharge between the mandrel which acts as the cathode and a nickel anode.

In this way, the porous die body 2 is molded by electroforming into a thickness of about 3 mm through the length and breadth and at the same time, the pores 9 are formed in the porous die body 2. The main reasons why the pores 9 are formed simultaneously with the electroforming are that the electrically-conductive film contains vinyl chloride, the plating solution contains no surfactant and the current applied during the electroforming is large. Thus, there is no necessity for machining the porous die body 2 to form pores after electroforming, so that it is possible not only to manufacture the high-quality porous die body 2 with ease and at a low cost, but also to control the diameter and the number of the pores 9 as desired by varying the conditions such as the amount of vinyl chloride and the magnitude of current applied during electroforming.

A method of molding a synthetic resin by using the porous die 1 having the above-described structure will now be explained.

The right and left porous dies 1 are first set in an open state so as to be opposed to each other in a blow molding machine (not shown). The coolant supply pipe 41 of the suction pump 42 (Logic Seal) is connected to the inlet nozzles 23 and the suction pipe 43 is connected to the suction nozzles 28. The suction pump 42 (Logic Seal) used in this embodiment has a suction power of 55 l/min at ¼ horsepower.

When the suction pump 42 is actuated, the air on the surface side of the porous die body 2 is sucked into the cooling chamber 17 through the pores 9 of the molding portion 6. The coolant (water is used in this embodiment) of the temperature controllers 44 and 45 is sucked into the cooling chamber 17 through the inlet nozzles 23, the circulation chambers 19 and the through holes 20. Both the air and the coolant are simultaneously sucked and discharged from the suction nozzles 28.

At this time, all the valves 22 of the inlet nozzles 23 and the valves 27 of the suction nozzles 28 are opened as a general rule, but the valves 22 of the inlet nozzles 23 on one side or the valves 27 of a part of the suction nozzles 28 may be completely or partially closed so as to change and control the flow of the coolant in the cooling chamber, thereby maintaining uniformity in the cooling of the porous die bodies 2.

A parison 31 of an ABS resin which is to be molded is next poured between the porous dies 1 from a synthetic resin extruding device (not shown) so as to clamp the porous dies 1. FIG. 1 shows the dies in the state in which the contact portions 4 have not been clamped yet. The clamping force is 15 tons and the clamping pressure applied to each of the contact portions 4 and the parting portions 7 is 46 kg/cm$_2$. The parison 31 is caught in the molding portions 6 of the porous die bodies 2 in an expanded state. When air is blown into the parison 31 from a pressurizing nozzle (not shown) at a blowing pressure of 5 to 6 kg/cm$^2$, the parison 31 is pressed against the molding portions 6 and is molded. At the initial stage of the molding, the valves 46 of the temperature controller 44 is opened so as to supply a coolant of a high temperature, thereby facilitating the transfer of the crimp pattern 8.

At this time, since the air on the surface side of the molding portions 6 is sucked to the back sides of the molding portions 6, the parison 31 is firmly attracted to the molding portions 6, whereby the crimp patterns 8 on the surface of the molding portions 6 are accurately transferred. Although it is generally difficult to transfer a fine configuration such as a crimp pattern merely by a blowing pressure, this embodiment enables the fine pattern to be transferred neatly. The pores 9 are not transferred because the diameter thereof is small.

At the stage in which the transfer of the crimp pattern 8 is completed, the valves 46 of the temperature controller 45 are opened and the valves 46 of the temperature controller 44 are closed so as to supply a coolant of a low temperature, thereby rapidly cooling the porous die bodies 2. The coolant of a low temperature is supplied to the cooling chamber 17 from the plurality of through holes 20. Since the cooling chamber is so designed as to come into direct contact with the back side of the porous die body 2, the coolant comes into direct contact with the back side of the porous die body 2, thereby cooling the porous die body 2 efficiently, strongly and uniformly. The porous die body 2 is therefore prevented from overheating, which fact enables the molding cycle t be shortened to about 1 minute, thereby greatly improving the molding efficiency.

Furthermore, since the air and the coolant which have entered the cooling chamber 17 are simultaneously sucked from the suction nozzles 28, as described above, there is no probability of the coolant exuding from the surface side of the porous die 1 through the pores 9 even if a small suction pump 42 (Logic Seal) is used as in this embodiment.

When a suction pump 42 having a suction power of 196 l/min at 2 horsepowers was used, it was able to further shorten the molding cycle.

In this embodiment, the stainless steel fibrous bodies 18 with which the cooling chamber 17 is filled manifest (1) an effect of uniformly introducing the coolant to the entire back side of the porous die body 2, (2) a permeating effect for causing the sucked air to flow smoothly in the cooling chamber 17, (3) an effect of reinforcing the porous die body 2, and (4) a heat conducting effect. Thus, the above-described suction effect and cooling effect are further enhanced.

Figure 5:
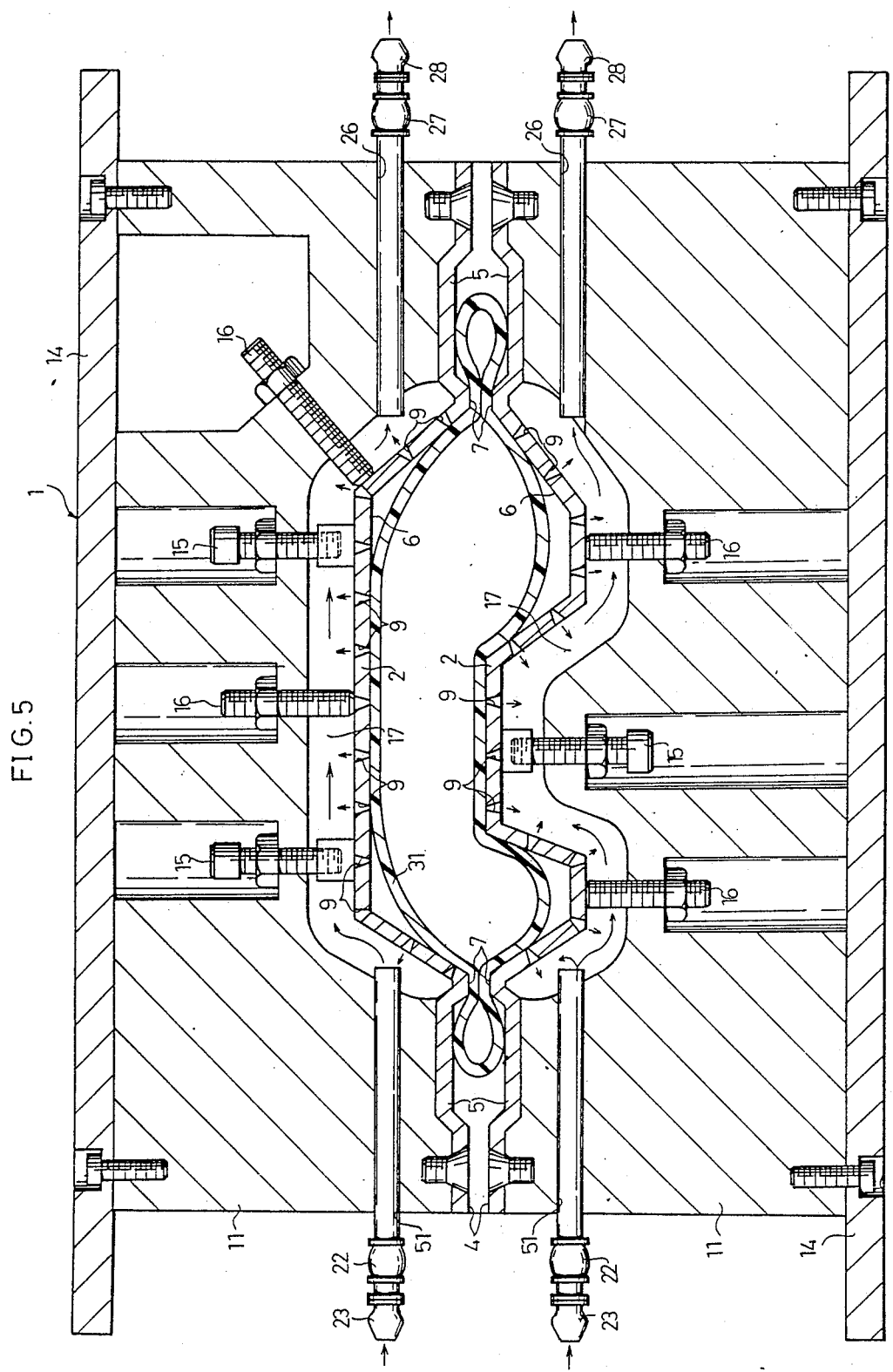
FIG. 5 is a cross sectional view of a second embodiment of a porous die according to the present invention.

A second embodiment of the present invention will be explained hereinunder with reference to FIG. 5.

The circulation chambers 19 and the through holes 20, which are used as means for supplying the coolant to the cooling chamber 17 in the first embodiment, are omitted in this embodiment. An inlet 51 which communicates with one end of the cooling chamber 17 is provided, and an inlet nozzle 23 having a valve 22 is attached to the inlet 51. The coolant is supplied from the inlet nozzle 23 to the cooling chamber 17. The coolant is sucked from the suction nozzles 27 which are provided on the other end side of the cooling chamber 17 in the same manner as in the first embodiment. Additionally, the cooling chamber 17 in this embodiment is not filled with the fibrous bodies unlike that in the first embodiment, but it may be filled with the fibrous bodies 18.

Since it is unnecessary to provide the circulation chambers 19 and the through holes 20 in this embodiment, it is possible to manufacture the frame body 11 with ease and at a low cost.

The present invention is not limited to these embodiments. For example, the suction pumps 42 may be connected to the temperature controllers 44 and 45, respectively, as shown in FIG. 6. The valves 46 provided between the suction pumps 42 and the porous dies 1 are opened or closed so as to supply water of a high temperature from the temperature controller 44 at the initial stage of molding, and to supply water of a low temperature from the temperature controller 45 when the transfer of the crimp pattern 8 is successfully completed.

Alternatively, one suction pump 42 may be connected to the porous dies 1, and one temperature controller 55 may be connected to the suction pump 42, as shown in FIG. 7. Water having a temperature of 10° to 20° C. is supplied from the temperature controller 55 to the suction pipe 42, and the porous die bodies 2 are appropriately cooled by opening or closing the valves 46. In this case, although it is possible to reduce the cost of the entire apparatus, the cooling efficiency is slightly lowered in comparison with the case of using the two temperature controllers 44 and 45, and the molding cycle is about 1.5 minutes.

The present invention is not limited by the structures of these embodiments, and various modification such as those which will be described in the following may be made without departing from the spirit of the invention:

(1) The pores 9 of the porous die body 2 are not restricted to those formed by electroforming. For example, the pores 9 may be made by laser beam machining or drilling the porous die body 2 after it has been molded without any pores.

(2) The porous die of the present invention may be used for molding a synthetic resin not only by blow molding, but also by vacuum molding, injection molding, rim urethane molding or the like.

(3) The temperature of the coolant supplied from the temperature controllers 44, 45 and 55 may be appropriately varied.

As many apparently widely different embodiments of this invention may be made without departing from the spirit and scope thereof, it is to be understood that the invention is not limited to the specific embodiments thereof except as defined in the appended claims.

What is claimed is:

1. A porous die comprising:
   a porous die body including a back side and further including a molding surface having a plurality of pores opening therethrough;
   a cooling chamber adjacent said back side of said porous die body opposite said molding surface and communicating with said molding surface through said pores;
   at least one inlet communicating with said cooling chamber for supplying a coolant to said cooling chamber so as to cool said porous die body;
   a suction hole communicating with said cooling chamber; and
   suction means coupled to said suction hole for drawing coolant from said cooling chamber at a rate sufficient to cause air to be drawn into said cooling chamber through said pores so that the coolant and air are drawn simultaneously from said cooling chamber through said suction hole.

2. A porous die according to claim 1, wherein said cooling chamber is provided therewithin with a plurality of fibrous bodies which are rammed so as not to lose permeability.

3. A porous die according to claim 1, wherein said porous die further includes a circulation chamber and wherein a partition is provided between said circulation chamber and said cooling chamber, said partition having a through hole communicating said cooling chamber with said circulation chamber.

4. A porous die according to claim 1, wherein said porous die body is molded by electroforming.

5. A porous die according to claim 1, wherein said suction hole includes a suction nozzle provided with a valve for maintaining uniformity in the cooling of said porous die body.

6. A porous die according to claim 2, wherein said fibrous bodies are made of any one of stainless steel, copper, iron, nickel and aluminum.

7. A porous die according to claim 3, wherein said circulation chamber includes therewithin a coolant flow control member for causing said coolant to flow along the back side of said porous die body.

8. A porous die according to claim 3, wherein a multiplicity of said through holes having a diameter of substantially 2 mm are formed through said partition at a pitch of substantially 30 mm.

* * * * *